United States Patent
O'Young et al.

(10) Patent No.: US 7,279,637 B1
(45) Date of Patent: *Oct. 9, 2007

(54) STAINLESS STEEL FACEPLATES WITH LABELS

(75) Inventors: Jason C O'Young, Oak Forest, IL (US); Mark J Donnell, Orland Park, IL (US); Jeremy S Parrish, Mokena, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/668,543

(22) Filed: Jan. 30, 2007

Related U.S. Application Data

(63) Continuation of application No. 11/344,395, filed on Jan. 31, 2006, now Pat. No. 7,183,487.

(51) Int. Cl.
*H02G 3/14* (2006.01)
(52) U.S. Cl. .......................... 174/66; 174/67; 220/241; 220/242
(58) Field of Classification Search .................. 174/66, 174/67, 53, 57, 58; 220/241, 242, 3.2, 3.3, 220/3.8; 439/535, 536; D13/156, 177
See application file for complete search history.

(56) References Cited

U.S. PATENT DOCUMENTS

| | | |
|---|---|---|
| 4,733,330 A | 3/1988 | Tanaka et al. |
| D348,825 S | 7/1994 | Below |
| 5,362,254 A | 11/1994 | Siemon et al. |
| 5,449,860 A | 9/1995 | Buckshaw et al. |
| 5,477,010 A | 12/1995 | Buckshaw et al. |
| D371,540 S | 7/1996 | Siemon et al. |
| 5,594,206 A | 1/1997 | Klas et al. |
| 5,594,208 A | 1/1997 | Cancellieri et al. |
| 5,613,874 A | 3/1997 | Orlando et al. |
| 5,744,750 A | 4/1998 | Almond |
| D411,733 S | 6/1999 | Lin |
| D429,623 S | 8/2000 | De brey et al. |
| 6,384,336 B1 | 5/2002 | VanderVelde et al. |
| 6,421,941 B1 | 7/2002 | Finke et al. |
| 6,616,005 B1 | 9/2003 | Pereira et al. |
| 6,683,248 B2 | 1/2004 | Vrame et al. |
| 6,765,149 B1 | 7/2004 | Ku |
| 6,943,297 B2 | 9/2005 | Capella |
| 7,030,319 B2 | 4/2006 | Johnsen et al. |

*Primary Examiner*—Angel R. Estrada
(74) *Attorney, Agent, or Firm*—Robert A. McCann; Aimee E. McVady

(57) ABSTRACT

The present invention is directed to a faceplate having a backing plate and a stainless steel cover plate. The backing plate includes at least one opening to receive a module and at least one pocket. The pocket includes a mounting snap. The cover plate includes at least one opening to receive the module and at least one pocket opening. The pocket opening includes a tab that extends from the cover plate. When faceplate is assembled, the mounting snap engages the tab to secure the cover plate to the backing plate.

4 Claims, 16 Drawing Sheets

STAINLESS STEEL FACEPLATES WITH LABELS

CROSS-REFERENCE TO RELATED APPLICATION

This application is a continuation of U.S. application Ser. No. 11/344,395, filed Jan. 31, 2006, now U.S. Pat. No. 7,183,487 the subject matter of which is hereby incorporated herein by reference in its entirety.

FIELD OF THE INVENTION

The present invention relates to a faceplate, and more particularly to an improved stainless steel faceplate with labels for identifying the modules therein.

BACKGROUND OF THE INVENTION

Stainless steel faceplates are typically formed from a stainless steel cover plate and a molded backing plate. The faceplates are designed to be mounted to a wall or an electric junction box. To assemble the faceplate, the stainless steel cover plate is typically riveted to the molded backing plate. This assembly process is costly and time consuming.

As such, there is a need to provide an improved stainless steel faceplate that is easier to assemble and less expensive to manufacture. There is also a need to provide an improved stainless steel faceplate that withstands the wear of a work environment.

SUMMARY OF THE INVENTION

The present invention is directed to a stainless steel faceplate. The faceplate includes a molded backing plate and a stainless steel cover plate. The backing plate includes at least one opening to receive a module and at least one label pocket. The label pocket has at least one mounting snap. The cover plate includes at least one opening to receive the module and at least one label pocket opening. The label pocket opening has at least one mounting tab that extends from the cover plate. To assemble the faceplate, the cover plate is mounted to the backing plate such that the mounting snap of the backing plate engages the mounting tab extending from tile cover plate thereby securing the cover plate to the backing plate.

The present invention is also directed to a stainless steel faceplate with Ultimate I.D.™ labels. The faceplate includes a molded backing plate and a stainless steel cover plate. The backing plate includes at least one opening for receiving a module, at least one label pocket and at least one mount pocket. The mount pocket has at least one mounting snap. The cover plate includes at least one opening for receiving the module, at least one label pocket opening and at least one mount pocket opening. The mount pocket opening has at least one tab that extends from the cover plate. To assemble the faceplate, the cover plate is mounted to the backing plate such that the mounting snap of the backing plate engages the tab extending from the cover plate thereby securing the cover plate to the backing plate.

DETAILED DESCRIPTION

Figure 1:
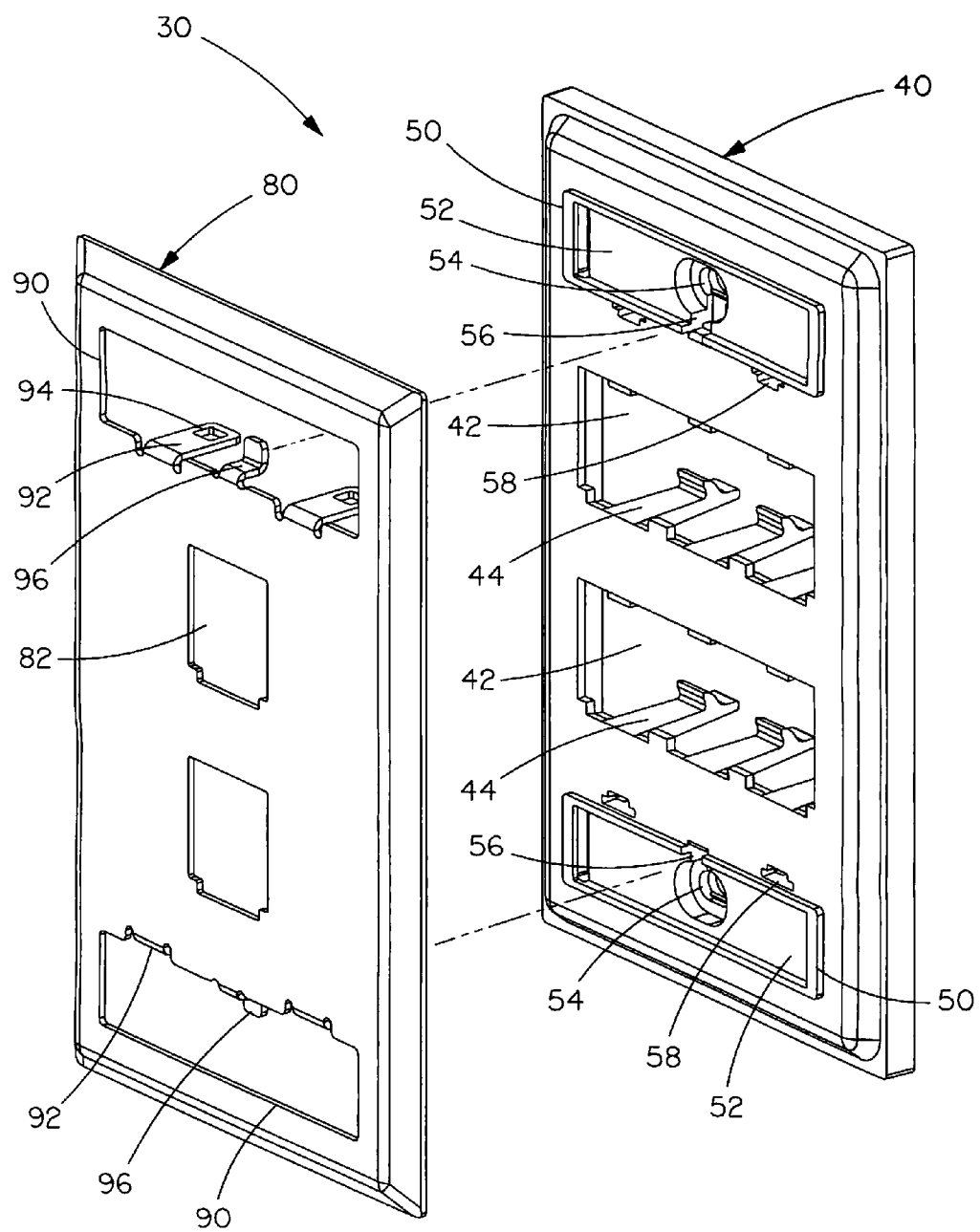
FIG. 1 is an exploded front perspective view of the faceplate of the present invention.

FIG. 1 illustrates a disassembled single gang faceplate 30 of the present invention. The faceplate 30 includes an injection molded backing plate 40 and a stamped cover plate 80. The cover plate 80 is formed from stainless steel.

The backing plate 40 includes module openings 42 with snap-fit geometry 44 for securing modules to the faceplate 30. As illustrated in FIG. 1, the module openings 42 of the backing plate 40 are capable of receiving up to six modules. If desired, the faceplate 30 of the present invention may be manufactured is a double gang faceplate with a backing plate having module openings capable of receiving up 12 modules (not illustrated).

The backing plate 40 also includes a pair of label pockets 50. Each label pocket 50 has a recessed portion 52 and a recessed mounting hole 54 positioned in the center of the label pocket 50. The recessed portion 52 of the label pockets 50 is designed to receive a label 108 and label cover 110 for identifying the modules to be mounted to the faceplate 30. The mounting hole 54 is designed to house a fastener 102, such as a screw (see FIGS. 7 and 8). The fastener 102 secures the assembled faceplate 30 to a wall 106 or to an electrical box. The mounting hole 54 also includes a recessed portion 56. As described below, the recessed portion 56 houses a retention tab 96 that extends from the cover plate 80 when the cover plate 80 is mounted to the backing plate 40.

Figure 2:
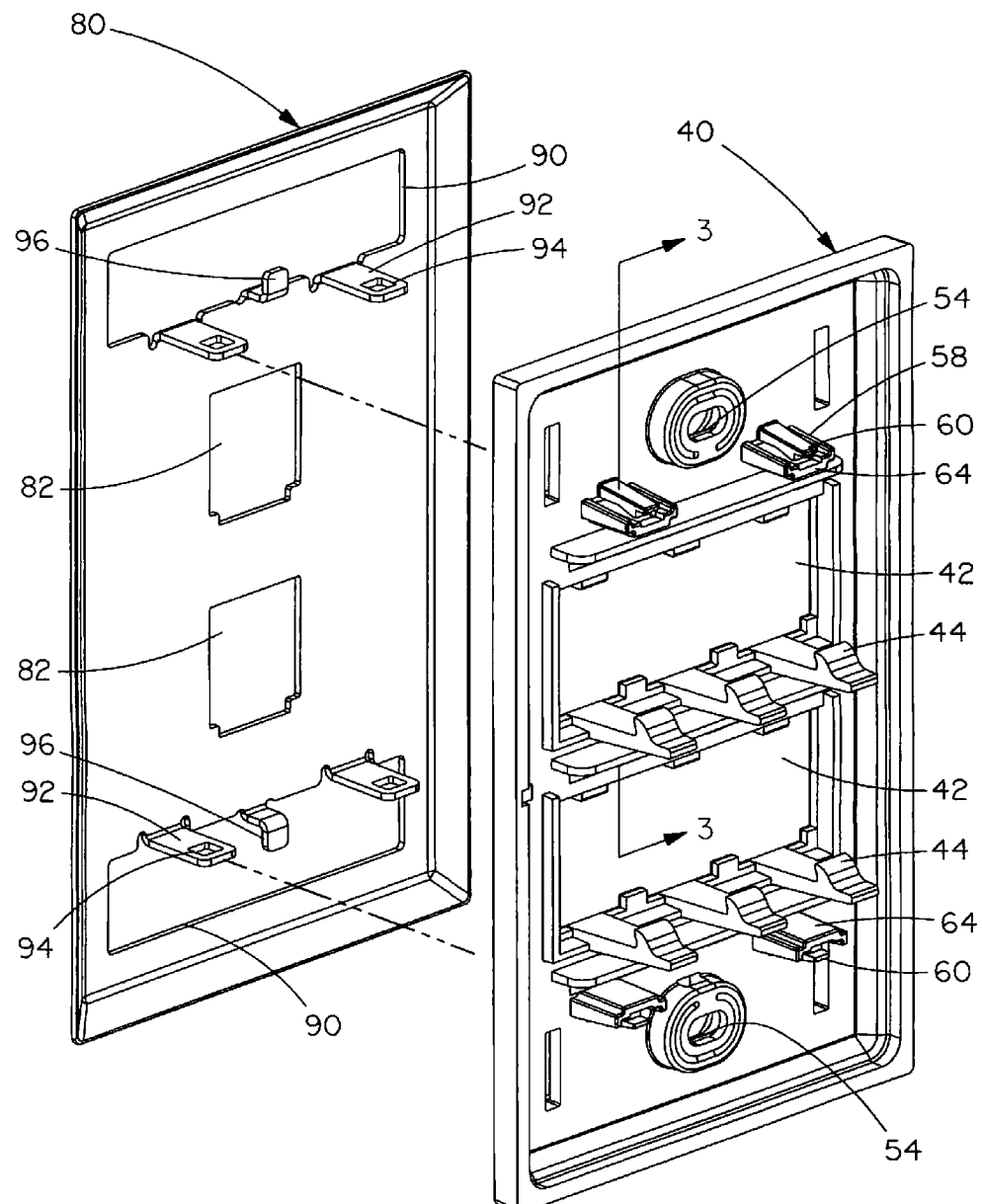
FIG. 2 is an exploded rear perspective view of the faceplate of FIG. 1.
Figure 3:
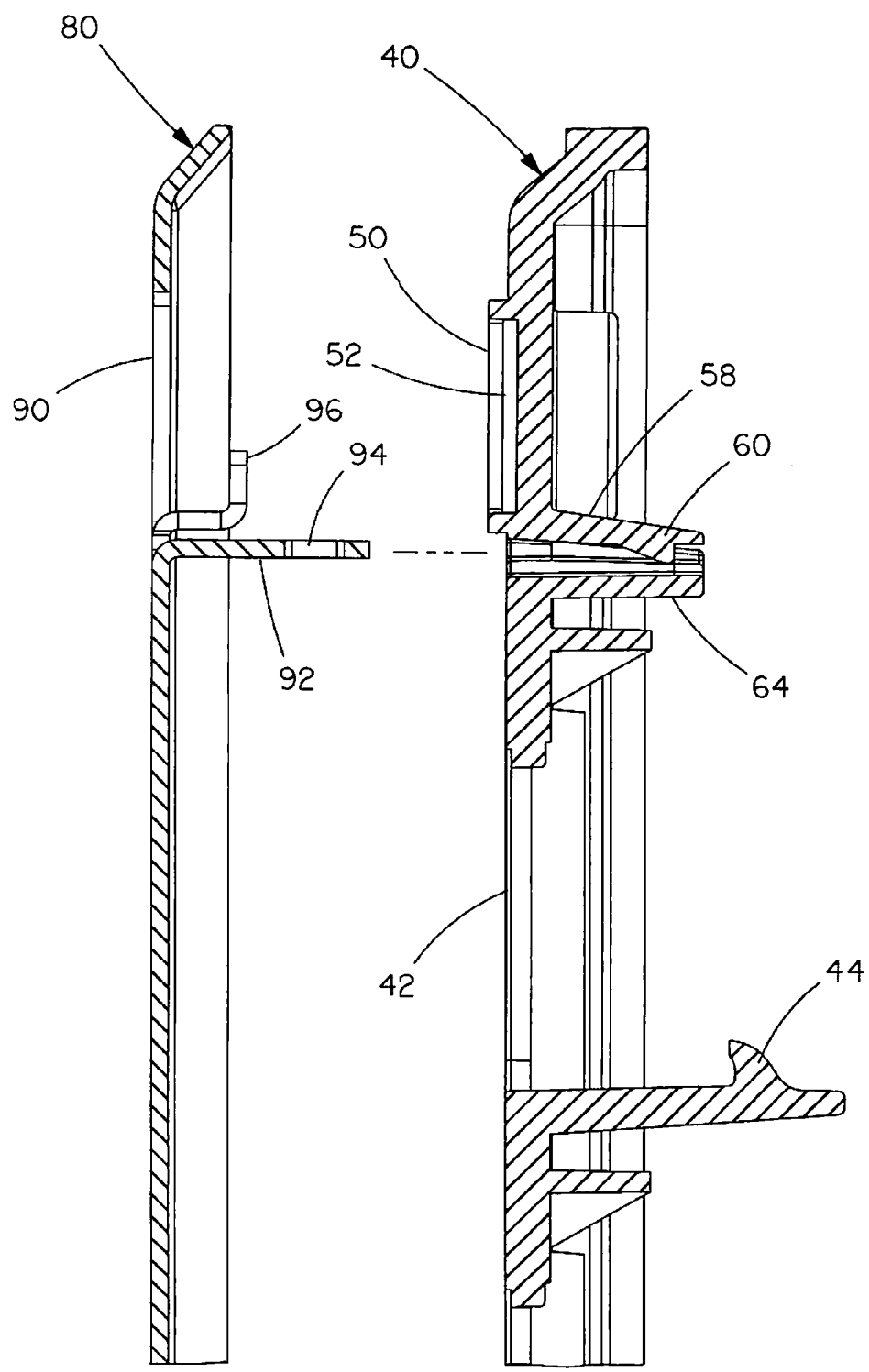
FIG. 3 is a cross sectional view of the faceplate of FIG. 2 taken along line 3-3.

The label pockets 50 also include mounting snaps 58. As illustrated in FIGS. 2 and 3, each mounting snap 58 extends outwardly from the back of the backing plate 40. Each mounting snap 58 includes a snap member 60 and a guide member 64 positioned a distance from the snap member 60. The mounting snaps 58 are positioned along the side of each label pocket 50 that is adjacent to the module openings 42. However, the mounting snaps 58 may be positioned along the ends of each label pocket 50.

Figure 12:
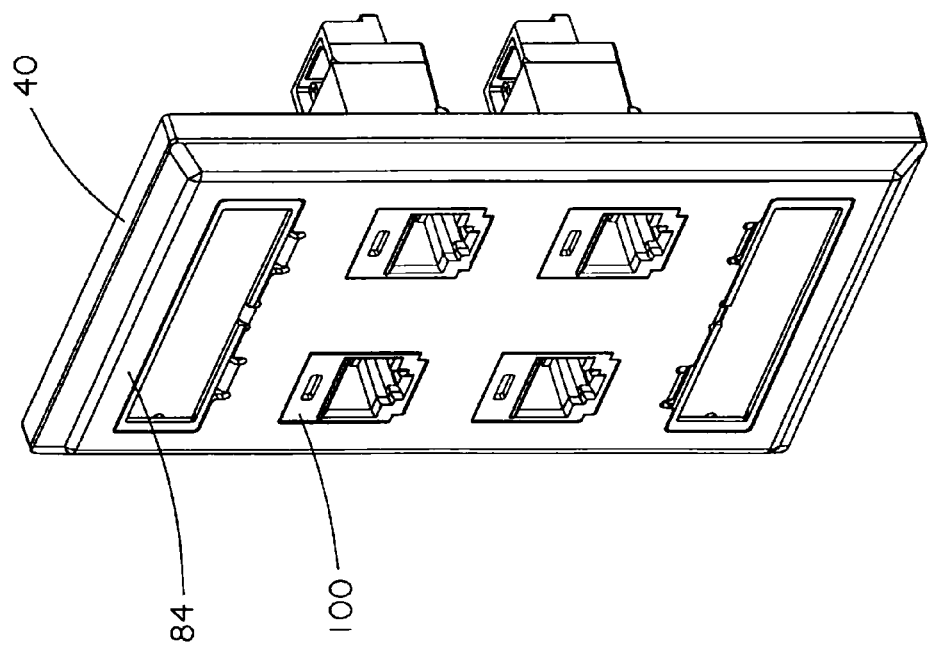
FIG. 12 is a front perspective view of the faceplate of the present invention with an alternative four position cover plate.

The cover plate 80 includes a plurality of openings 82 for receiving modules. The cover plate 80 for the single gang faceplate can be designed with openings that receive two modules, four modules (see FIG. 12), or six modules (see FIG. 13). Alternatively, the cover plate may be designed with openings that receive one module, three modules, or five modules (not illustrated). If the faceplate of the present invention is manufactured as a double gang faceplate, the cover plate may be manufactured with openings capable of receiving up 12 modules (not illustrated).

The cover plate 80 also includes label pocket openings 90 located near the top and bottom of the cover plate. The label pocket openings enable the labels 108 and the label covers 110 installed in the backing plate 40 to be visible when the cover plate 80 is mounted to the backing plate 40. Each label pocket opening 90 includes mounting tabs 92 that extend outwardly from the back of the cover plate 80. Each mounting tab 92 is generally rectangular with a generally rectangular aperture 94 therethrough. The mounting tabs 92 are located along the side of each label pocket opening 90 that is adjacent to the module openings 82. However, the mounting tabs 92 may be positioned along the ends of the label pocket opening 90.

Each label pocket opening 90 also includes a retention tab 96. The retention tabs 96 are positioned between the mounting tabs 92 in the label pocket opening 90. Each retention tab 96 extends outward towards the back of the cover plate 80 and upward towards the center of the label pocket opening 90.

Figure 4:
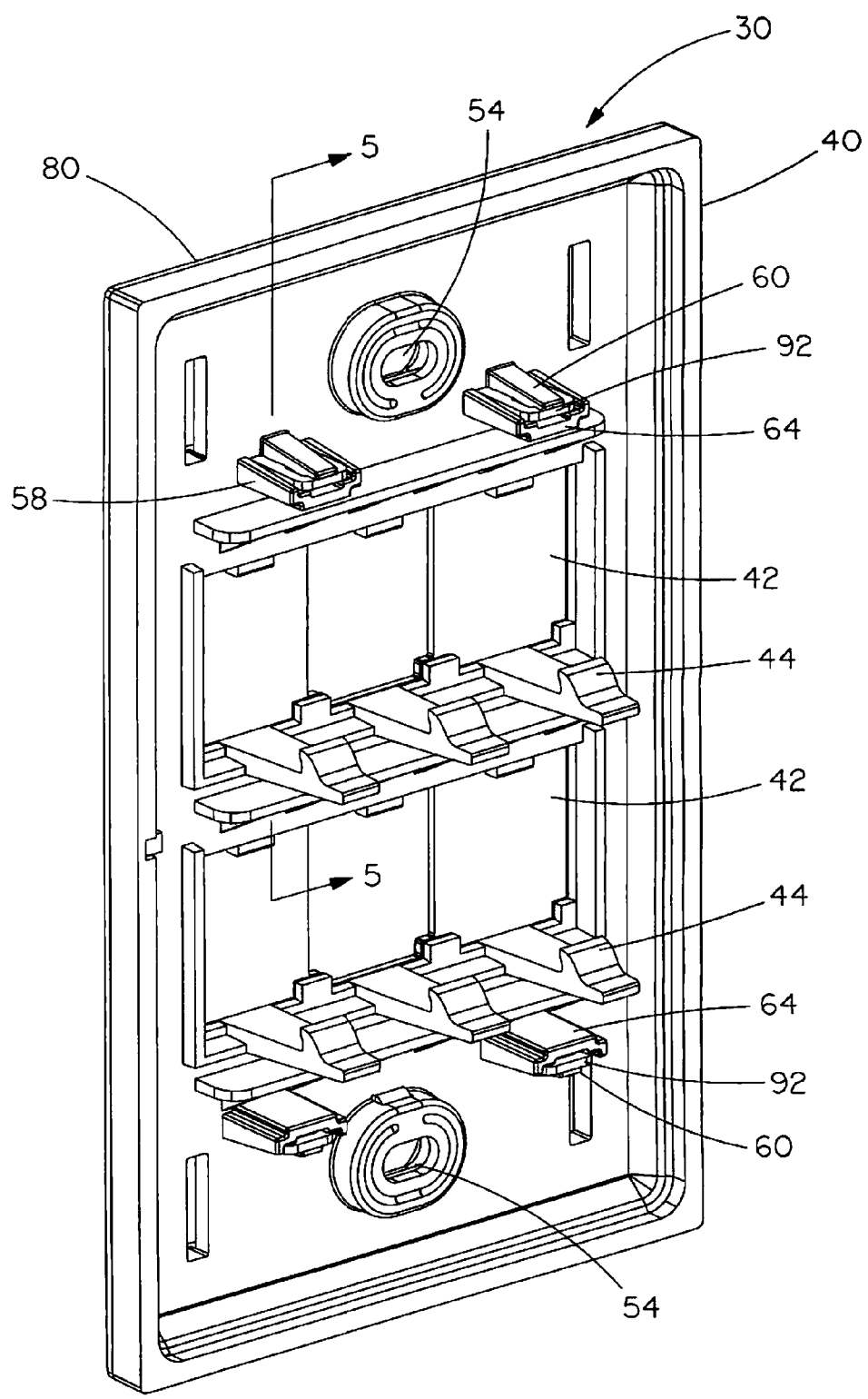
FIG. 4 is a rear perspective view of the assembled faceplate of FIG. 1.
Figure 5:
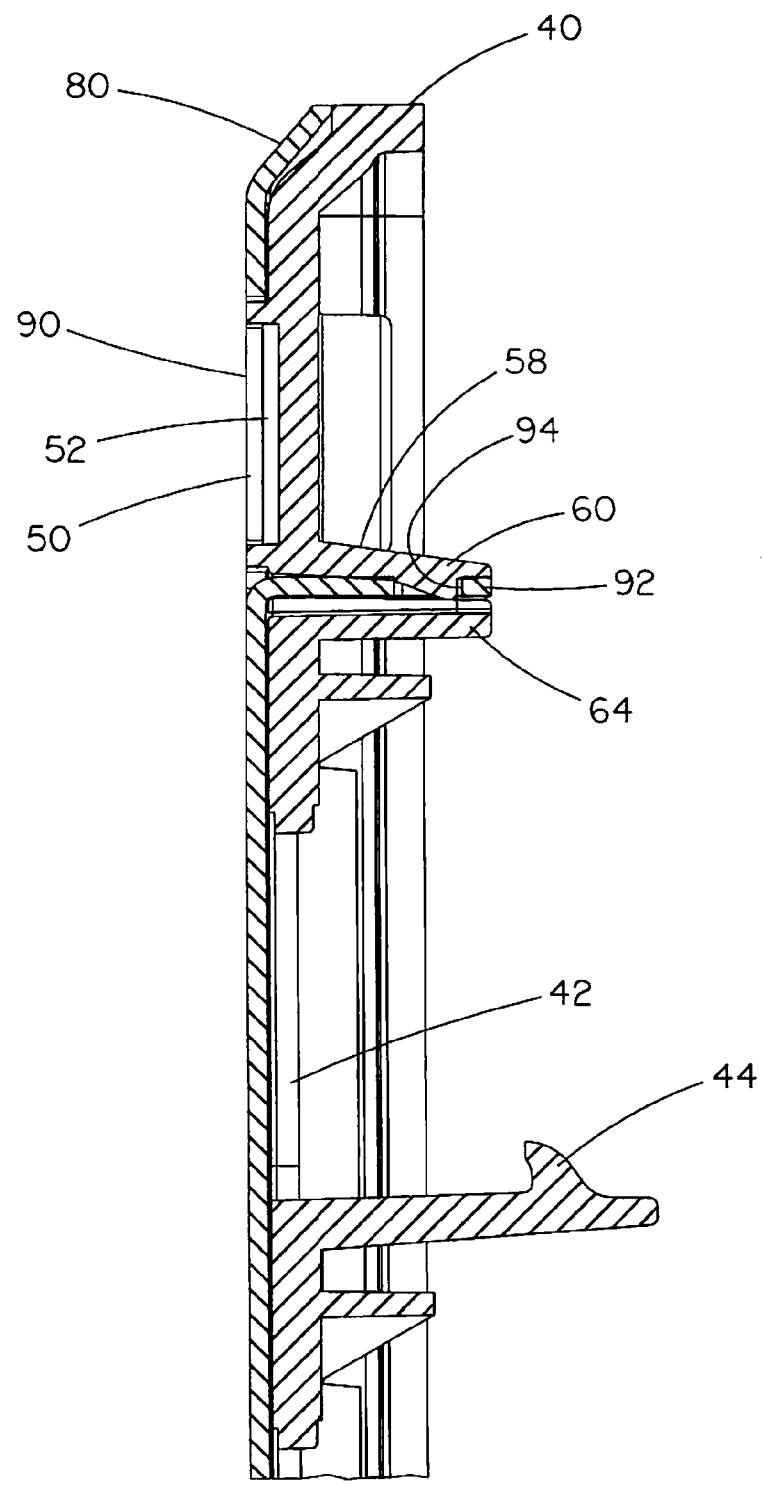
FIG. 5 is a cross sectional view of the faceplate of FIG. 4 taken along line 5-5.
Figure 6:
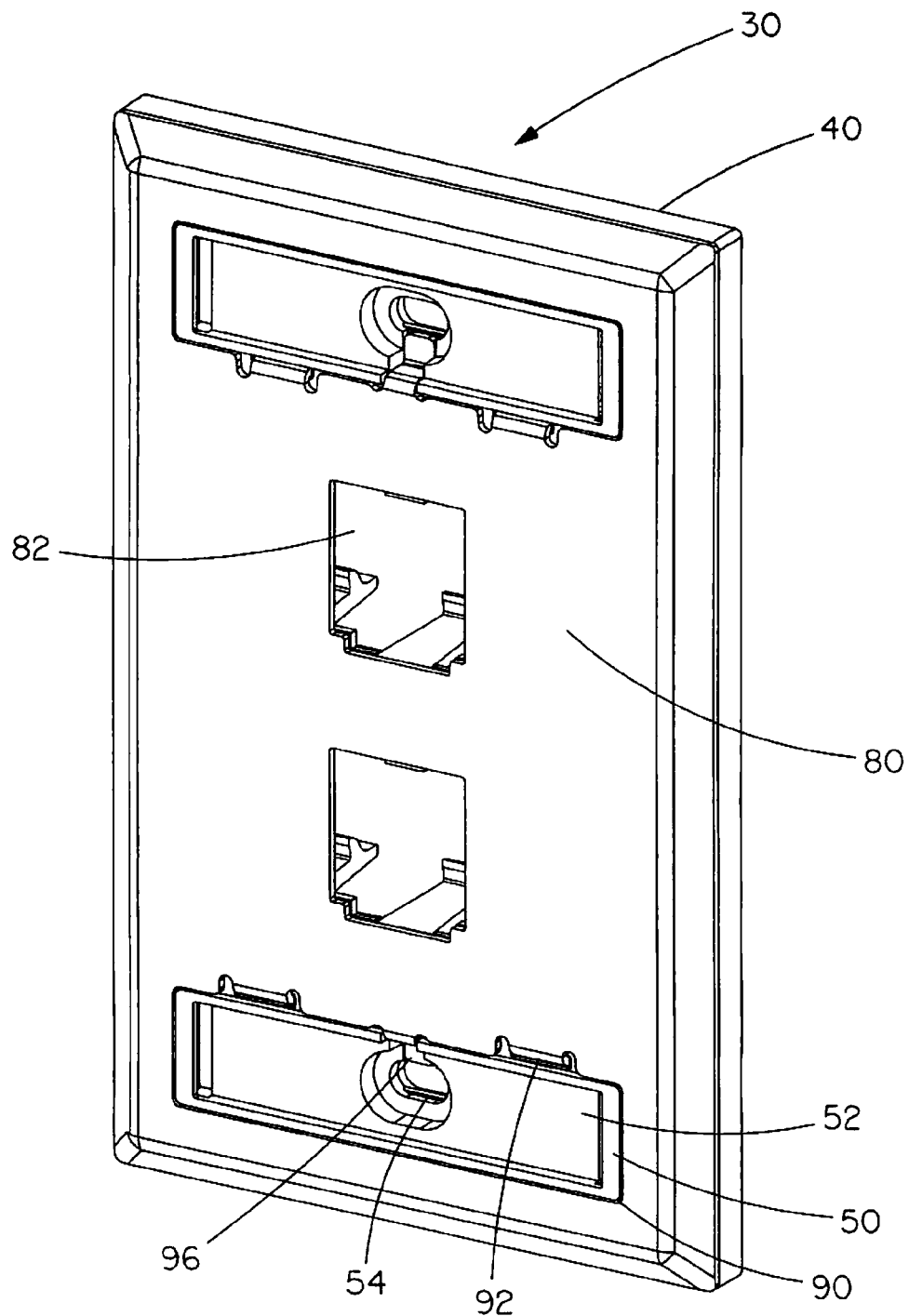
FIG. 6 is a front perspective view of the assembled faceplate of FIG. 4.

As illustrated in FIG. 3, when the cover plate 80 is positioned over the backing plate 40, the mounting tabs 92 are aligned with the mounting snaps 58. FIGS. 4-6 illustrate the cover plate 80 mounted to the backing plate 40. The mounting tabs 92 are positioned within the mounting snaps 58 such that a portion of the snap member 60 of each mounting snap 58 is positioned within the aperture 94 of each mounting tab 92. The guide members 64 of the mounting snaps 58 maintain the direction of the mounting tabs 92 thereby prohibiting the mounting tabs 92 from twisting or bending as the cover plate 80 is mounted to the backing plate 40.

As shown in FIGS. 4 and 6, when the cover plate 80 is mounted to the backing plate 40 the module openings 82 and 42 are aligned so that the modules may be easily installed in the faceplate 30. Additionally, when the cover plate 80 is mounted to the backing plate 40, each retention tab 96 is positioned within one of the recessed portions 56 of the mounting holes 54. As Such, the retention tab 96 is flush with the mounting hole 54.

Figure 7:
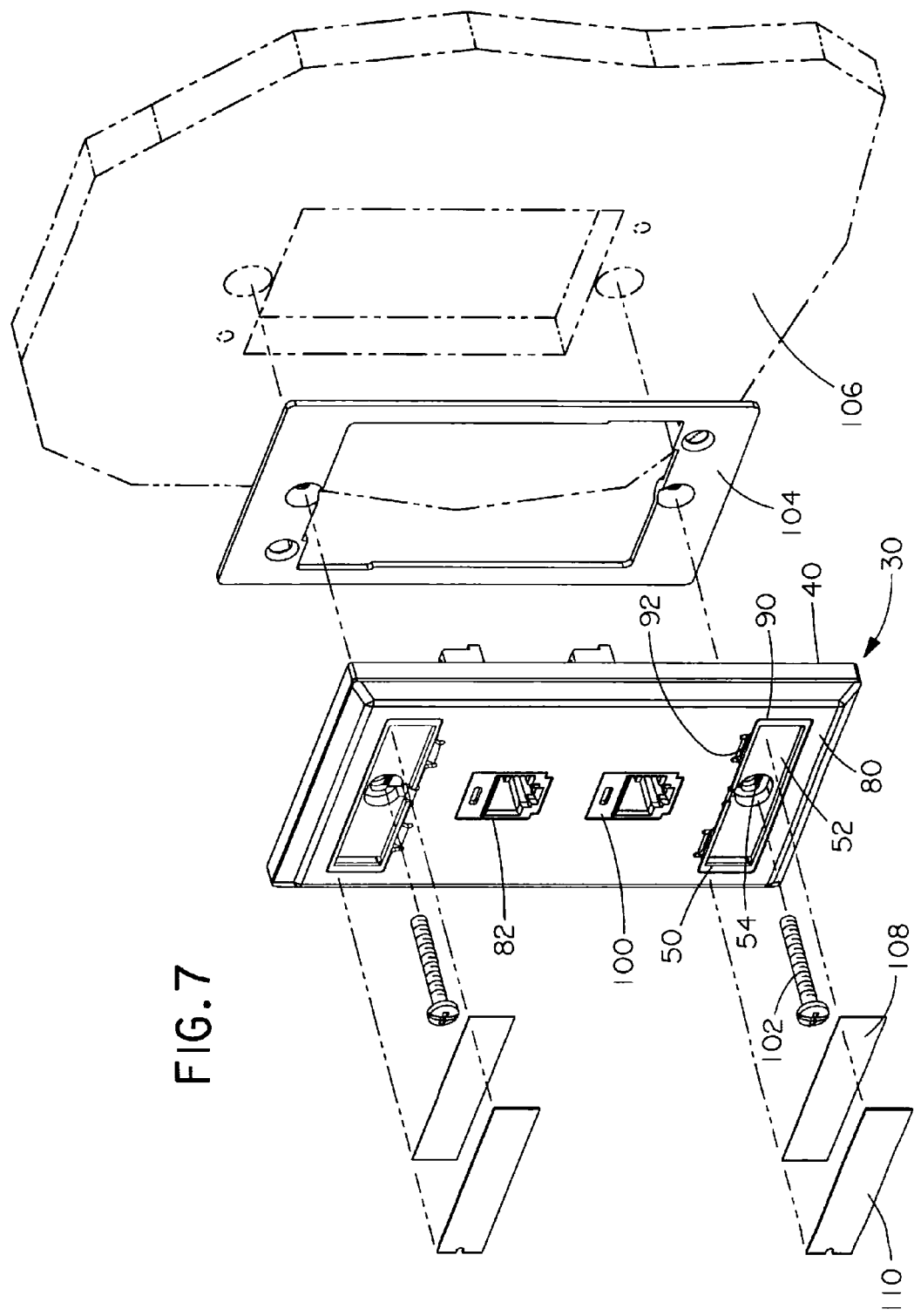
FIG. 7 is an exploded view of the assembled faceplate of FIG. 4 with a label and a label cover to be attached to a wall.

FIG. 7 illustrates the faceplate 30 with the cover plate 80 snap mounted to the backing plate 40 and modules 100 installed therein. The assembled faceplate 30 is positioned to be mounted to a wall board adapter 104 and a wall 106. The wall board adapter 104 is mounted to the wall 106 by two screws and two "L" clips (not illustrated). The faceplate 30 is mounted to the wall board adapter 104 and the wall 106 via fasteners 102, such as screws. Alternatively, the faceplate 30 may also be mounted to an electrical box (not illustrated).

Figure 8:
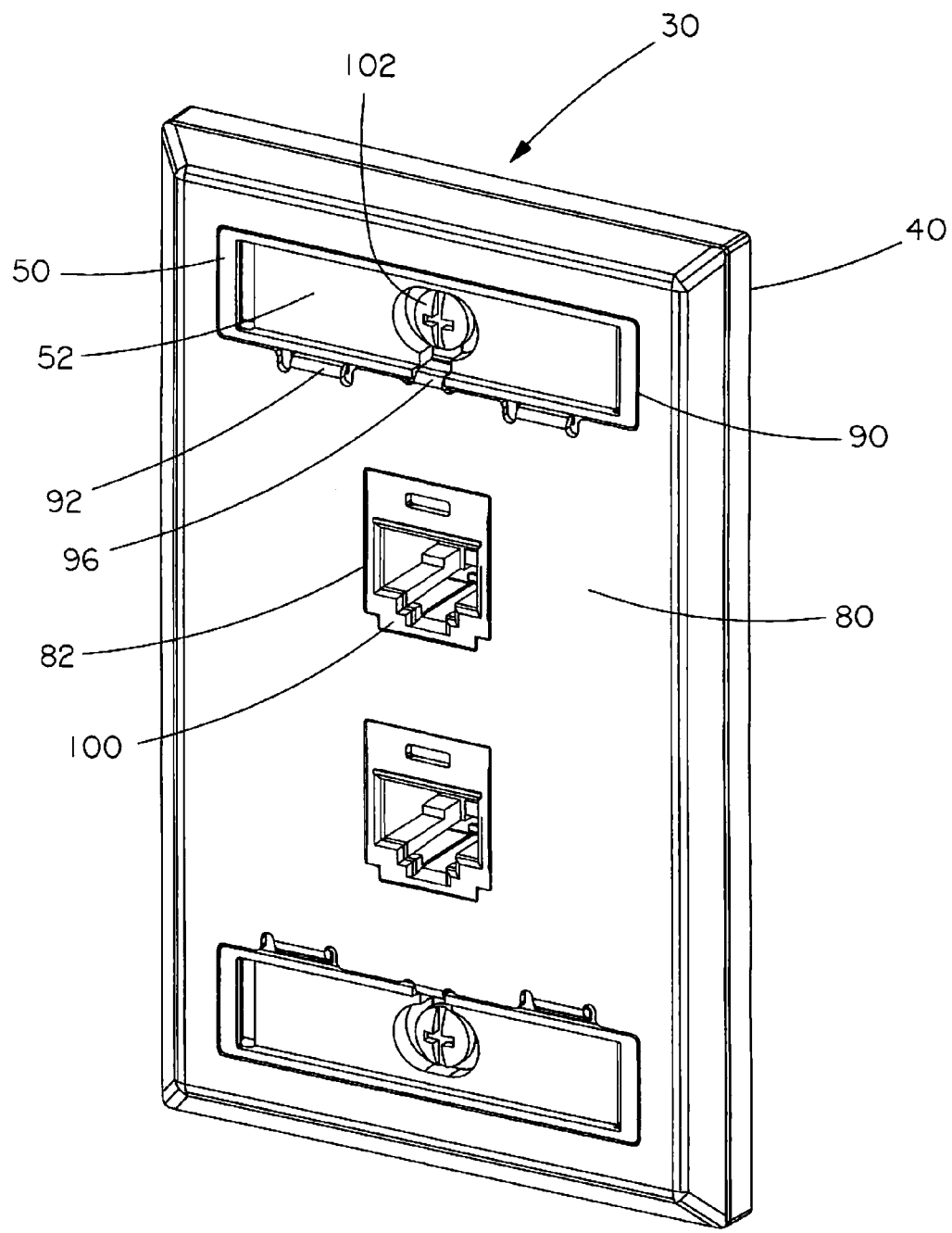
FIG. 8 is a front perspective view of the assembled faceplate of FIG. 7 with a fastener installed in the faceplate to secure the faceplate to the wall.
Figure 9:
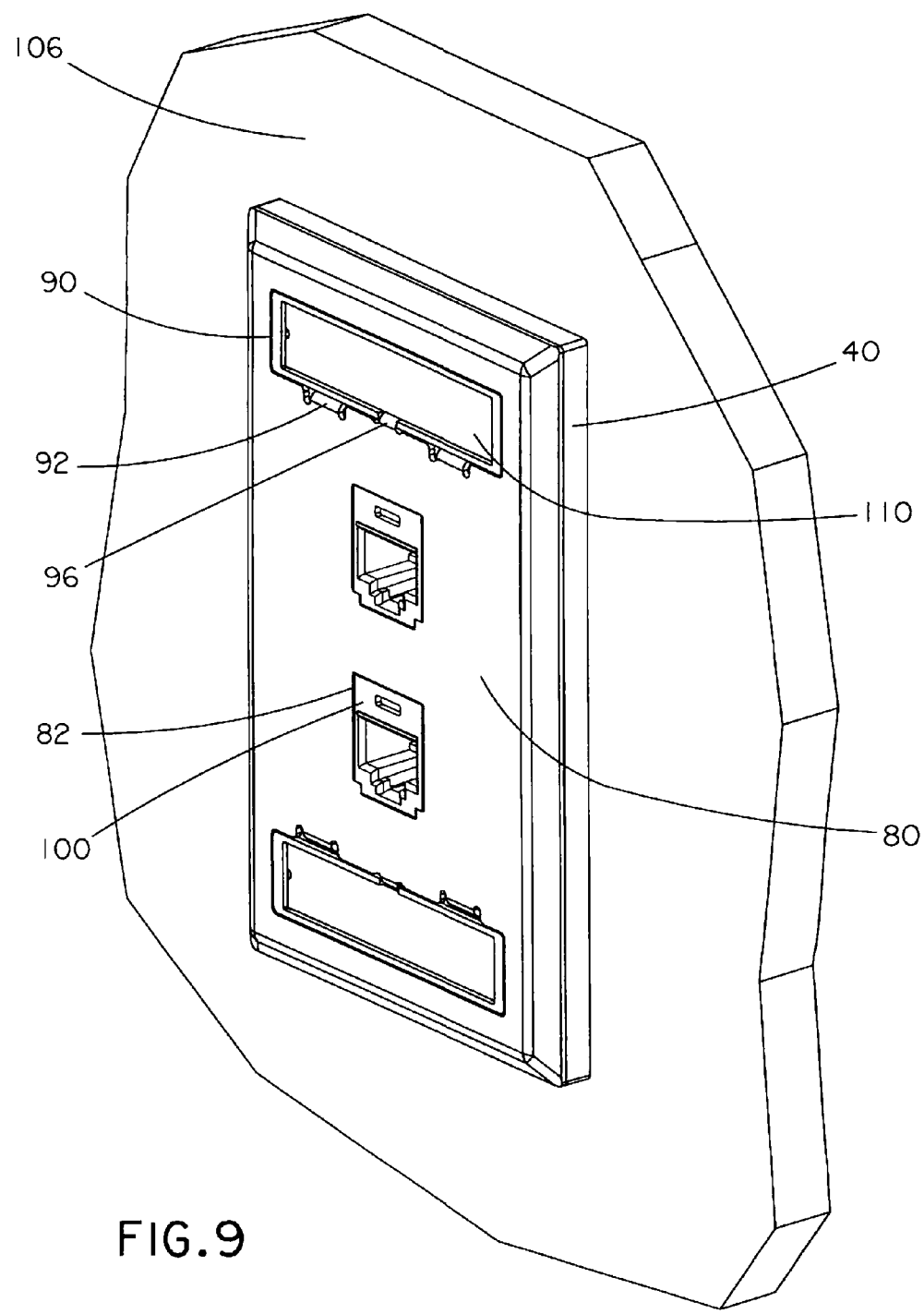
FIG. 9 is a front perspective view of the faceplate of FIG. 7 secured to the wall.
Figure 10:
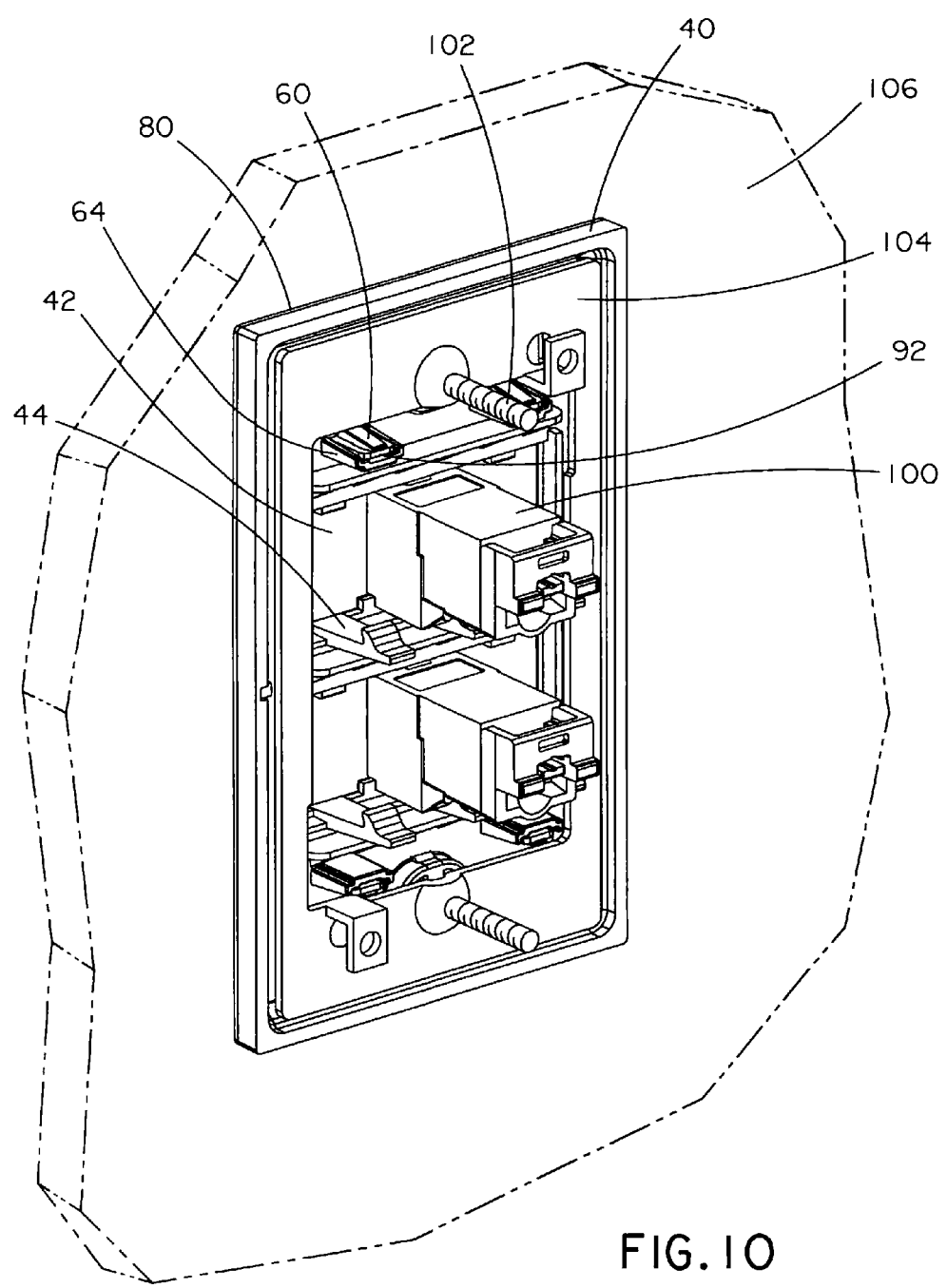
FIG. 10 is a rear perspective view of the faceplate of FIG. 7 secured to the wall.
Figure 11:
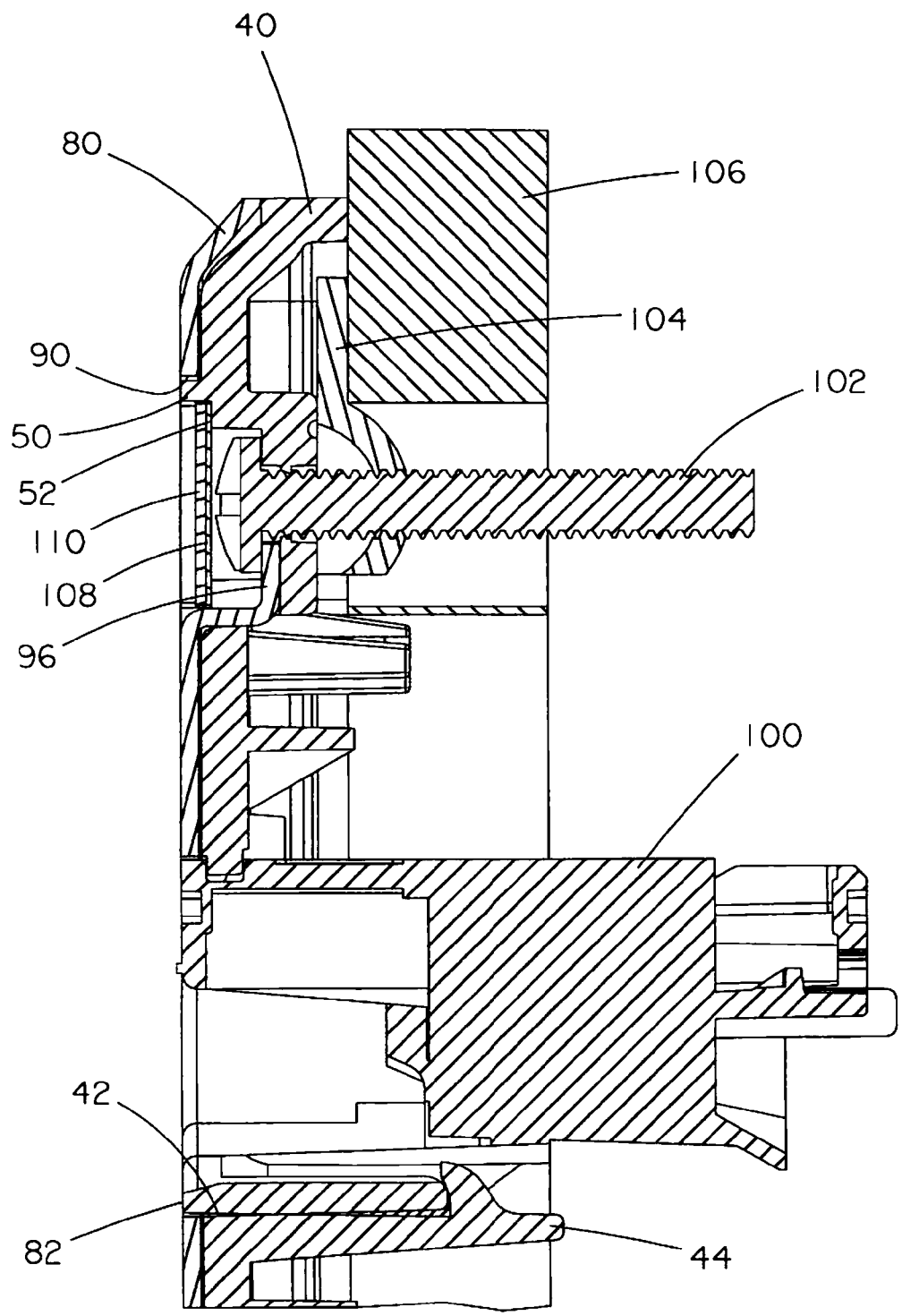
FIG. 11 is a cross sectional view of the faceplate of FIG. 9 secured to the wall.

As shown in FIG. 8, fasteners 102 are installed in the mounting holes 54 of the backing plate 40. When the fasteners 102 are placed in the mounting holes 54, each fastener 102 is positioned over a portion of one of the retention tabs 96. As a result, the retention tabs 96 ensure that the cover plate 80 and the hacking plate 40 remain connected to each other when the faceplate 30 is installed on the wall 106. As illustrated in FIGS. 9-11, once the faceplate 30 is mounted to the wall 106m the labels 108 and label covers 110 may be installed through the label pocket opening 90 of the cover plate 80 and in the label pocket 50 of the backing plate 40. The labels 108 and the label covers 110 are disposed in the label pocket recesses 52 thereby covering the fastener 102 positioned within the mounting hole 54.

Figure 13:
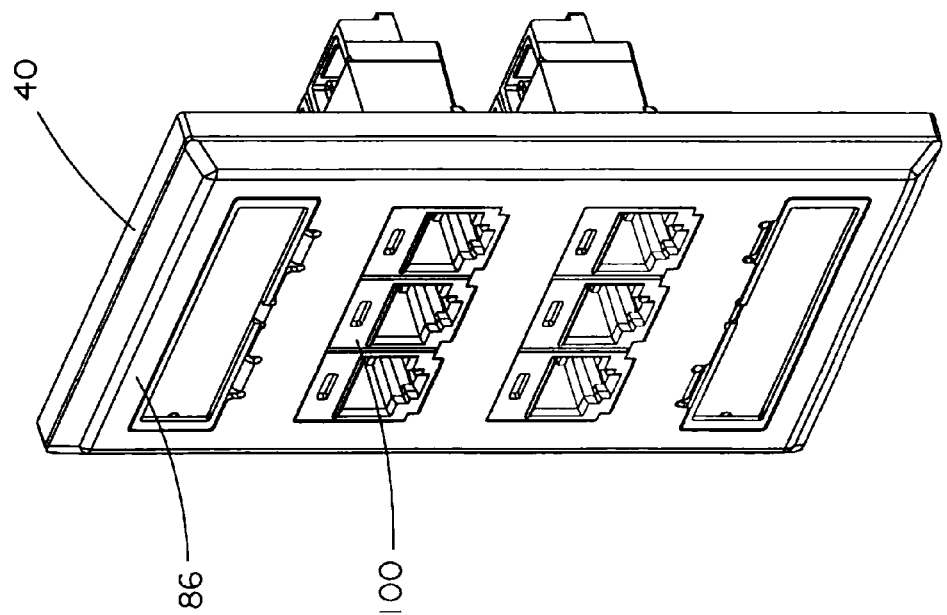
FIG. 13 is a front perspective view of the faceplate of the present invention with an alternative six position cover plate.

As discussed above, the faceplate 30 of the present invention may also be formed with a four position cover plate 84 that provides module openings 82 for four modules (FIG. 12) or a six position cover plate 86 that provides module openings 82 for six modules (FIG. 13). Alternatively, a one position, three position or five position cover plate may also be used. Each alternative cover plate would be mounted to the backing plate 40 as described above to enable the desired number of modules to be installed in the faceplate 30.

Figure 14:
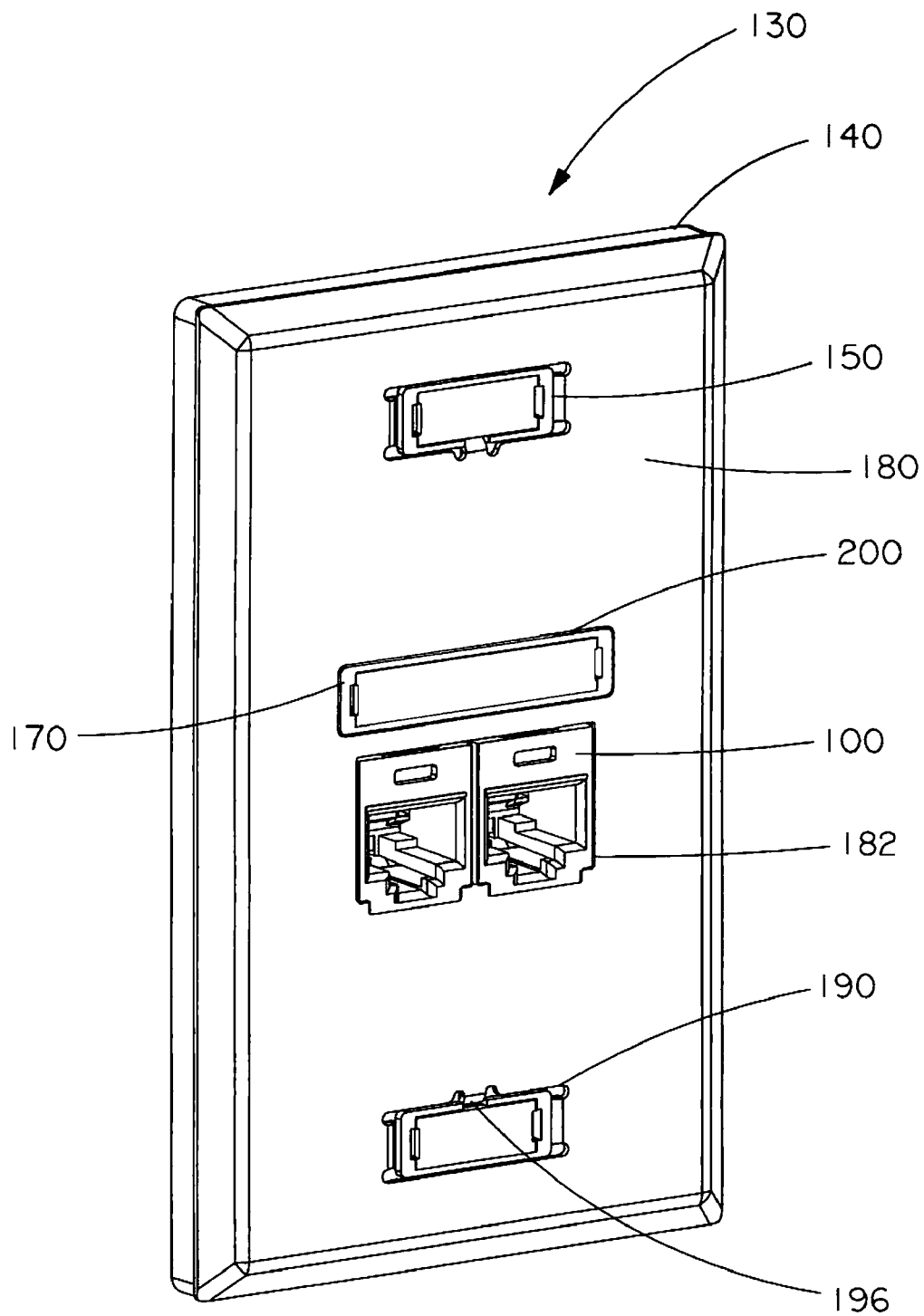
FIG. 14 is a perspective view of an alternative faceplate of the present invention for two modules.
Figure 15:
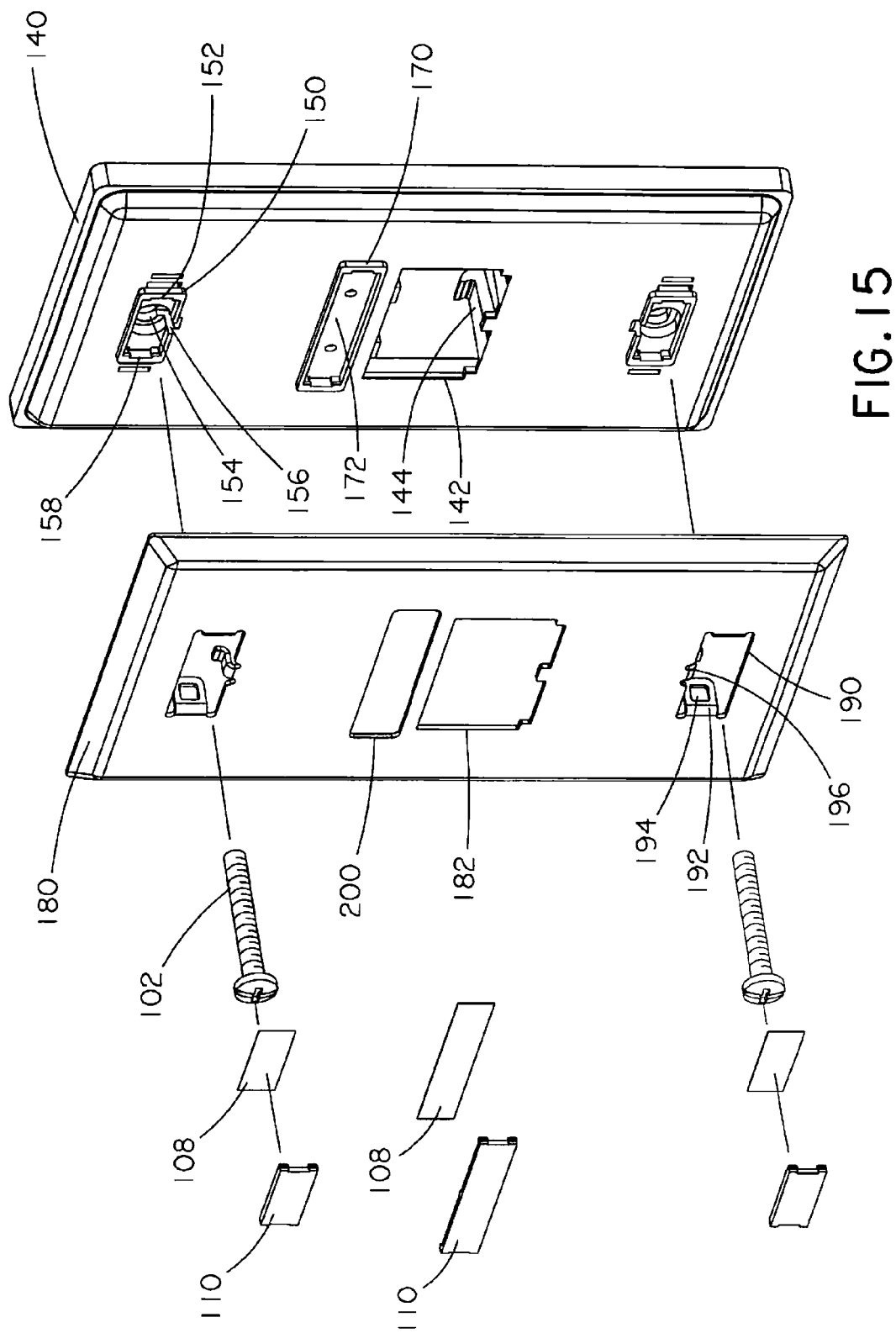
FIG. 15 is an exploded front perspective view of the faceplate of FIG. 14 with labels and label covers.
Figure 16:
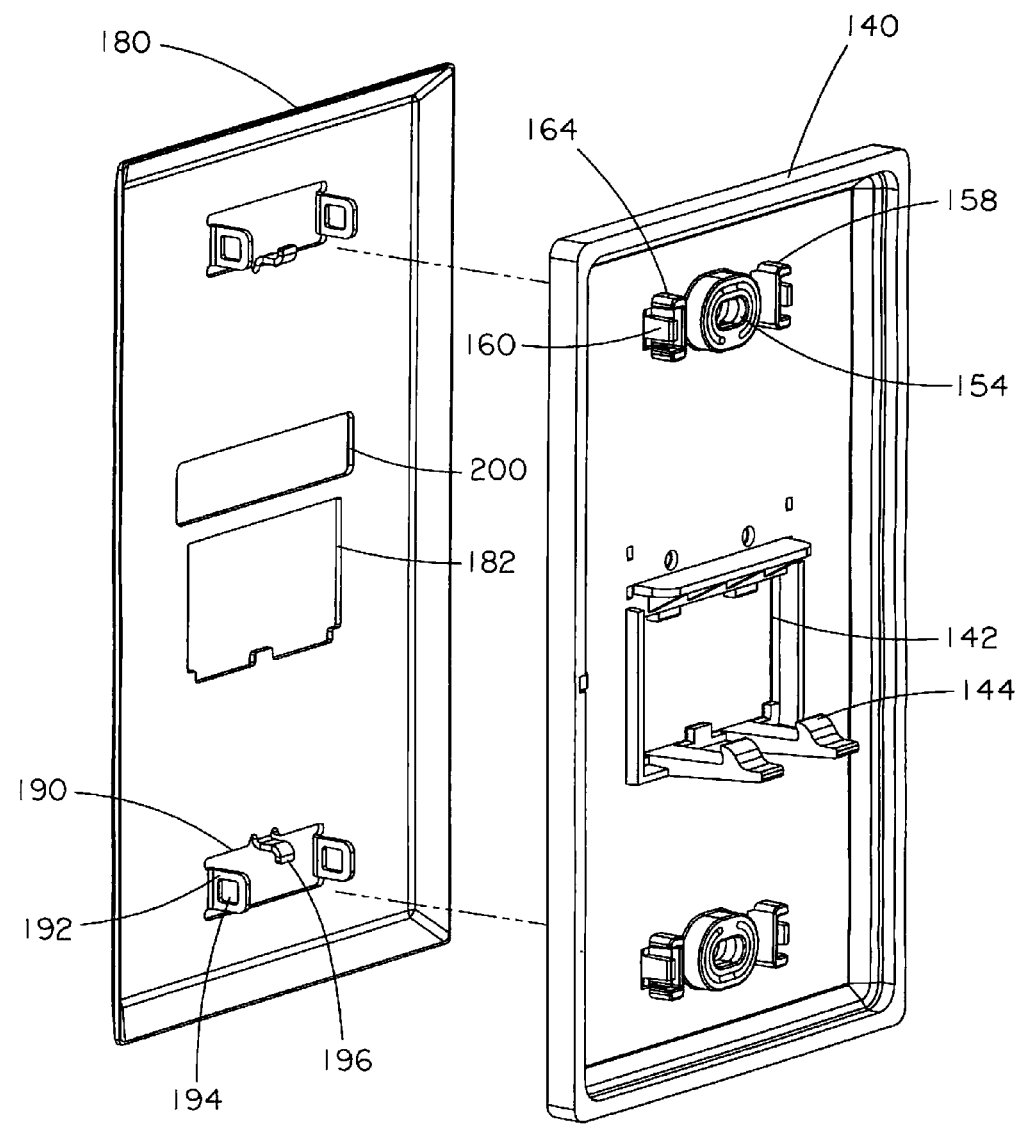
FIG. 16 is an exploded rear perspective view of the faceplate of FIG. 14.

As illustrated in FIGS. 14-18, an alternative faceplate 130 of the present invention is designed with a backing plate 140 and a cover plate 180 that enable Ultimate I.D. labels to be provided to identify each module. As illustrated in FIGS. 15-16, the backing plate 140 includes module openings 142, mount pockets 150 with a recessed portion 152 and a mount hole 154 positioned in the center of the mount pocket 150, and at least one label pocket 170 with a recessed portion 172. The recessed portions 152, 172 of each mount pocket 150 and the label pocket 170, respectively, are designed to receive a label 108 and label cover 110 for identifying the modules to be mounted to the faceplate 130.

Each mount pocket 150 also includes mounting snaps 158. The mounting snaps 158 extend outwardly from the back of the backing plate 140. The mounting snaps 158 include a snap member 160 and a guide member 164 positioned a distance from the snap member 160. As illustrated in FIGS. 15-16, the mounting snaps 158 are positioned along the ends of each mount pocket 150. However, the mounting snaps 158 may be positioned along the sides of each mount pocket 150.

Each mounting hole 154 is designed to house a fastener 102, such as a screw, to secure the faceplate 130 to a wall or to an electrical box, as described above. Each mounting hole 154 also includes a recessed portion 156 that houses a retention tab 196 extending from the cover plate 180 when the cover plate is mounted to the backing plate 140.

The cover plate 180 includes openings 182 for receiving modules, mount pocket openings 190, and at least one label pocket opening 200. The mount pocket openings 190 include mounting tabs 192 that extend outwardly from the back of the cover plate 180. The mounting tabs 192 are located along the ends of each mount pocket opening 190. However, the mounting tabs 192 may be positioned along the sides of each mount pocket opening 190. Each mounting tab 192 is generally rectangular with a generally rectangular aperture 194.

The mount pocket openings 190 also include a retention tab 196 positioned in the center of the mount pocket openings 190. The retention tabs 196 extend outward towards the back of the cover plate 180 and upward towards the center of the mount pocket opening 190.

When the cover plate 180 is mounted to the backing plate 140, the mounting tabs 192 are positioned within the mounting snaps 158 such that a portion of the snap member 160 of each mounting snap 158 is positioned within the aperture 194 of each mounting tab 192. The guide members 164 prohibit the mounting tabs 192 from twisting or bending as the cover plate 180 is mounted to the backing plate 140. The retention tab 196 is positioned in the recessed portion 156 of the mounting hole 154 to further retain the cover plate 180 to the backing plate 140 when the faceplate 130 is secured to a wall or electrical box. Additionally, when the cover plate 180 is mounted to the backing plate 140, the label pocket 170 and the label pocket opening 200 are aligned so that the labels 108 and the label covers 110 may easily be installed in the faceplate 130 and the module openings 142 and 182 are aligned so that modules 100 may easily be installed in the faceplate 130.

Figure 18:
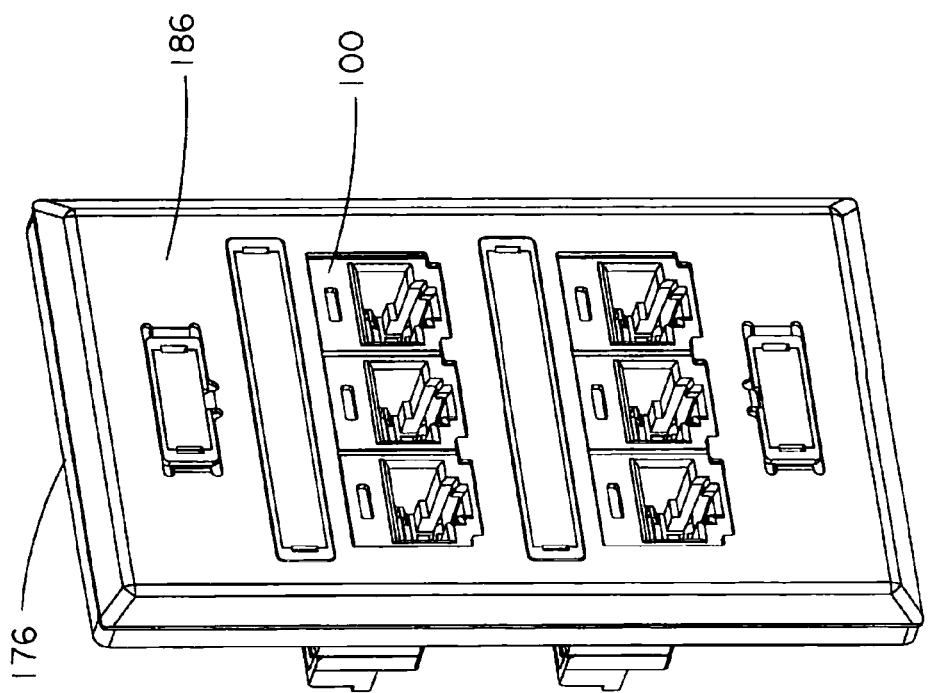
FIG. 18 is a perspective view of the faceplate of FIG. 14 for six modules.
Figure 17:
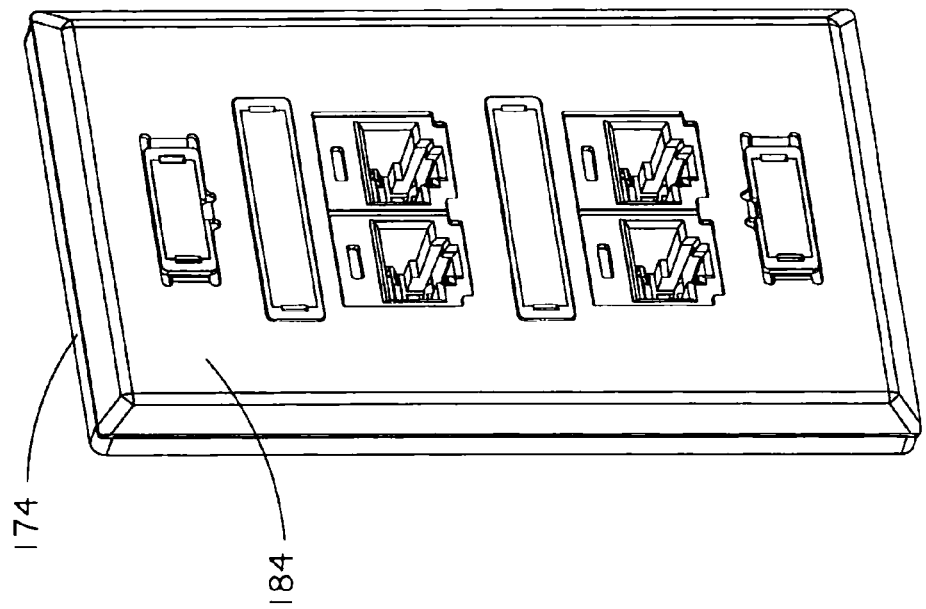
FIG. 17 is a perspective view of the faceplate of FIG. 14 for four modules.

The alternative single gang faceplate may be designed to accommodate up to six modules as illustrated in FIGS. 14, 17, and 18. The faceplates are formed from three different backing plates 140, 174, 176 and three corresponding cover plates 180, 184, 186 with at least one label pocket and at least one module opening varying in length, as desired.

The improved faceplate of the present invention is easily assembled by snap mounting the stainless steel cover plate to the molded backing plate. The assembled faceplate is durable thereby withstanding the wear of a work environment.

Furthermore, while the particular preferred embodiments of the present invention have been shown and described, it will be obvious to those skilled in the art that changes and modifications may be made without departing from the teaching of the invention. The matter set forth in the foregoing description and accompanying drawings is offered by way of illustration only and not as limitation. The actual scope of the invention is intended to be defined in the following claims when viewed in their proper perspective based on the prior art.

The invention claimed is:

1. A faceplate comprising:
    a backing plate having at least one opening for receiving a module, at least one pocket, and at least one mounting snap; and
    a cover plate having at least one opening for receiving the module and at least one pocket opening, the at least one pocket opening having at least one tab extending from the cover plate;
    wherein the at least one tab includes an aperture, whereby when the cover plate is mounted to the backing plate the mounting snap is positioned in the aperture to secure the cover plate to the backing plate.

2. The faceplate of claim 1, wherein the at least one tab extends from a back of the cover plate and the at least one mounting snap extends from a back of the backing plate.

3. The faceplate of claim 1, wherein the at least one mounting snap includes a snap member.

4. The faceplate of claim 1, wherein the cover plate is stainless steel.

* * * * *

UNITED STATES PATENT AND TRADEMARK OFFICE
CERTIFICATE OF CORRECTION

PATENT NO. : 7,279,637 B1 Page 1 of 1
APPLICATION NO. : 11/668543
DATED : October 9, 2007
INVENTOR(S) : Jason C. O'Young et al.

It is certified that error appears in the above-identified patent and that said Letters Patent is hereby corrected as shown below:

Col. 1, line 45, "from tile cover" should read --from the cover--.

Col. 2, line 48, "manufactured is a" should read --manufactured as a--.

Col. 4, line 3, "the hacking plate" should read --the backing plate--.
line 6, "wall 106m" should read --wall 106,--.
line 24, "Ultimate I.D." should read --Ultimate I.D.$^{TM}$--.

Signed and Sealed this

First Day of April, 2008

JON W. DUDAS
*Director of the United States Patent and Trademark Office*